United States Patent
Van de Kop et al.

(10) Patent No.: US 6,188,221 B1
(45) Date of Patent: Feb. 13, 2001

(54) METHOD AND APPARATUS FOR TRANSMITTING ELECTROMAGNETIC WAVES AND ANALYZING RETURNS TO LOCATE UNDERGROUND FLUID DEPOSITS

(76) Inventors: Franz Van de Kop; Bridget M. Van de Kop, both of 6831 Hilo St., Diamondhead, MS (US) 39525-3535; Andrew R. Van de Kop, 8012 Forest Trail, Dallas, TX (US) 75238

(*) Notice: Under 35 U.S.C. 154(b), the term of this patent shall be extended for 0 days.

(21) Appl. No.: 09/130,778

(22) Filed: Aug. 7, 1998

(51) Int. Cl.$^7$ .............................. G01V 3/12; G01S 13/02
(52) U.S. Cl. ................................ 324/337; 324/334
(58) Field of Search ................................. 324/337–342, 324/334, 329; 342/22, 27, 82, 88, 371

(56) References Cited

U.S. PATENT DOCUMENTS

| | | | |
|---|---|---|---|
| 1,045,575 | 11/1912 | Lowy | 324/334 |
| 2,657,380 | 10/1953 | Donaldson | 250/262 |
| 3,524,129 | 8/1970 | Ikrath | 181/141 |
| 3,617,866 | 11/1971 | Dowsett et al. | 324/334 |
| 3,701,940 | 10/1972 | Nilsson | 324/357 |
| 4,246,538 | 1/1981 | Barker | 324/323 |
| 4,308,499 | 12/1981 | Thierbach et al. | 324/338 |
| 4,835,474 | 5/1989 | Parra et al. | 324/357 |
| 5,148,110 | 9/1992 | Helms | 324/364 |
| 5,357,253 | 10/1994 | Van Etten et al. | 324/337 |
| 5,486,764 | 1/1996 | Thompson et al. | 324/323 |

FOREIGN PATENT DOCUMENTS

| | | |
|---|---|---|
| 41 33 863 A1 | 4/1993 | (DE). |
| 2 320 562 | 3/1997 | (FR). |

*Primary Examiner*—Jay Patidar
(74) *Attorney, Agent, or Firm*—Gardere Wynne Sewell LLP; Ari O. Pramudji (57) ABSTRACT

An electromagnetic (EM) survey system for determining the presence of liquid or gaseous deposits within the earth's interior. The system includes an EM pulse generator for generating the EM pulses, a data acquisition system for receiving and processing reflected signals from the earth's interior caused by the EM pulses, and a data processing system for analyzing the reflected signals to determine the presence of fluids in the earth's interior. Delivery of the EM pulses to the earth's interior can be accomplished either invasively or non-invasively. In an invasive manner, the EM pulse is delivered to the earth's interior via a set of electrodes buried shallow into the ground. In a non-invasive coupling, the EM pulse is delivered to the earth's interior via a wire loop. The reflected signals are received from the earth's interior via one of a wire loop, set of electrodes, wire antenna, or rod antenna array.

28 Claims, 7 Drawing Sheets

METHOD AND APPARATUS FOR TRANSMITTING ELECTROMAGNETIC WAVES AND ANALYZING RETURNS TO LOCATE UNDERGROUND FLUID DEPOSITS

BACKGROUND OF THE INVENTION

1. Field of the Invention

The present invention relates generally to the detection of underground fluids and, more particularly, to the detection of underground fluids by analysis of reflected electromagnetic (EM) waves from the earth's interior.

2. Description of the Related Art

Fluids, such as water, oil, and natural gas, are frequently exploited natural resources. These fluids may sometimes be found at the earth's surface, but are frequently located underground. Either way, it is typically advantageous to locate a source of the fluid near the point of its exploitation to minimize transportation costs, although production costs may influence this factor.

For instance, water is a relatively inexpensive resource to provide to a community providing that there is an abundance of the water located proximate to the community. The water may be supplied from surface sources, such as lakes or rivers, but may also be supplied from underground sources such as aquifers, which are water bearing, subterranean, geological formations. Typically, the further a community is located from a water supply, the more expensive it is to supply water to that community. Accordingly, it is advantageous to locate a water supply that is proximate to the community.

Although the existence of water on the earth's surface, such as lakes and rivers, can be easily located by mere visual sighting; acquifers cannot due to their presence beneath the earth's surface. The same is true for subterranean hydrocarbon deposits and other underground fluids.

Numerous prior art techniques have been employed to detect and locate subterranean fluids. Of these techniques, electromagnetic waves have been transmitted into the ground in order to conduct subsurface imaging to attempt to identify subterranean features. However, the systems implementing these techniques typically have been bulky and complex, and, thus, difficult to transport. Furthermore, these systems have typically been expensive due to their complexity.

The present invention is directed to overcoming, or at least reducing the effects of, one or more of the problems set forth above.

SUMMARY OF THE INVENTION

In one aspect of the present invention, an apparatus includes an electromagnetic pulse generator that generates a plurality of electromagnetic pulses and a transmit ground coupling transducer, coupled to the pulse generator, for delivering the plurality of electromagnetic pulses to the earth's interior. The apparatus also includes a data acquisition system for processing a plurality of reflected signals, with the reflected signals being the electromagnetic pulses reflected from the earth's interior and a receive ground coupling transducer, coupled to the data acquisition system, for receiving and supplying the reflected signals to the data acquisition system. The apparatus further includes a data processing system, coupled to the data acquisition system, for comparing the reflected signals to determine the existence of fluids in the earth's interior.

In one aspect of the present invention, a method is provided for determining the presence of fluids within the earth's interior. The method includes generating a series of electromagnetic pulses into the earth's interior; receiving a series of reflected signals from the earth's interior, the reflected signals being the electromagnetic pulses reflected from the earth's interior; passing the series of reflected signals through a filtering and amplification channel; converting the amplified reflected signals to digital signals; and comparing the reflected signals to determine the presence of fluids within the earth's interior.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nonetheless be a routine undertaking for those of ordinary skill in the art having the benefit of this disclosure.

Figure 1:
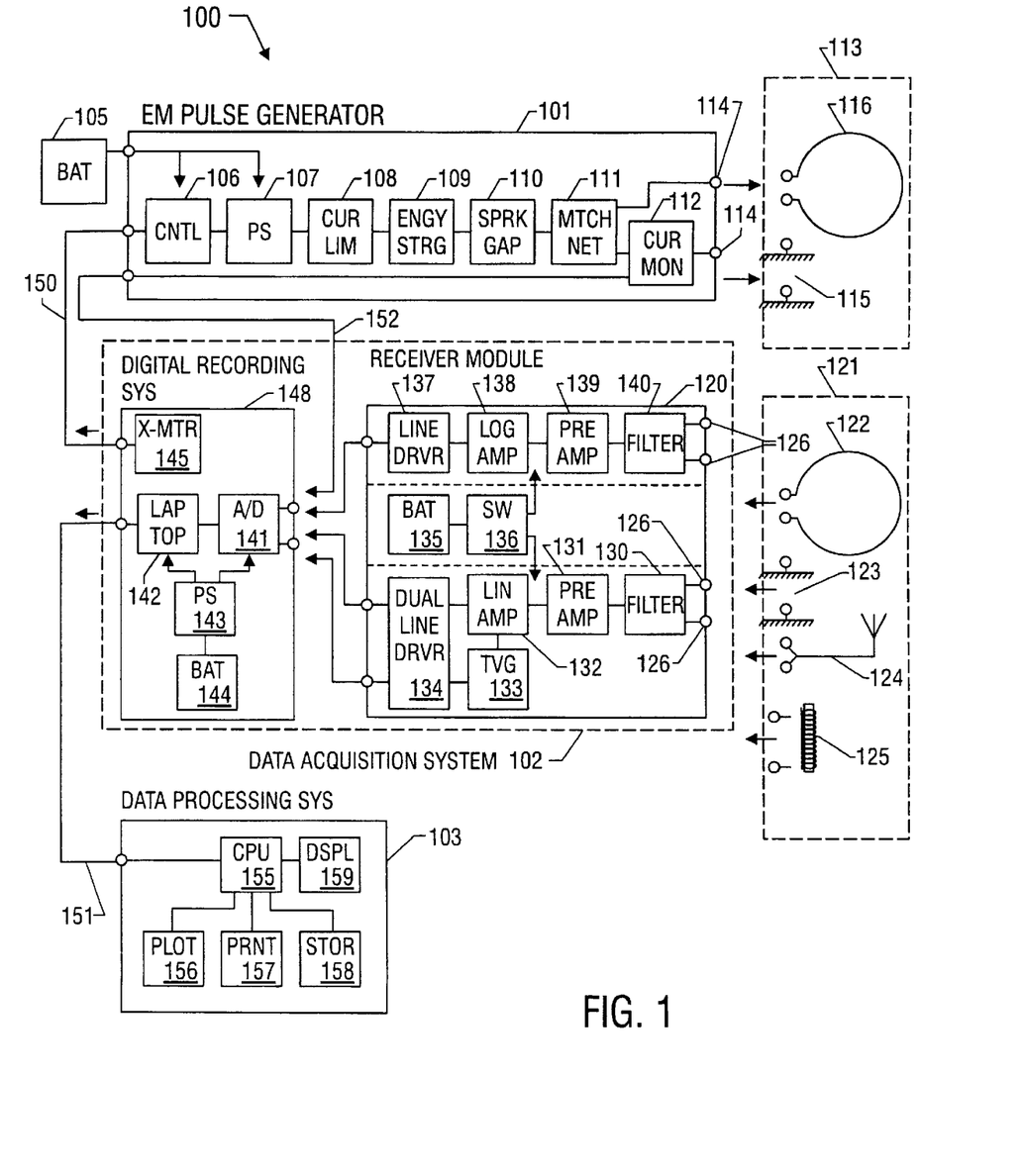
FIG. 1 is a block diagram of one embodiment of an electromagnetic system constructed and operated in accordance with the present invention.

Turning now to the drawings, and specifically referring to FIG. 1, a block diagram of an electromagnetic (EM) survey system 100 is shown. The system 100 transmits electromagnetic pulses into the earth and subsequently analyzes the reflected signals from the earth's interior to determine the presence of fluids beneath the earth's surface. In one embodiment, the EM survey system 100 is deployed to detect the presence of acquifers; however, it will be appreciated that the presence of other types of fluids, such as hydrocarbon deposits of oil or natural gas, could also be detected without departing from the spirit and scope of the invention.

The EM survey system 100 includes an electromagnetic (EM) pulse generator 101, a data acquisition system 102, and a data processing system 103. The EM pulse generator 101 is powered by a power source 105. In the embodiment of FIG. 1, the power source 105 is a battery enabling the generator 101 to be portable. The battery 105 is external to the EM pulse generator 101. However, it will be appreciated that the battery 105 could be an integral part of the EM pulse generator 101, if so desired.

The EM pulse generator 101 comprises a control unit 106 for controlling the overall operation of the generator 101. The control unit 106 receives its instructions from the data acquisition system 102 via a fiber-optic coupling 150. The manner in which the control unit 106 receives instructions from the data acquisition system 102 will be further understood as the detailed description proceeds. The control unit 106 is further coupled to a high-voltage power supply 107 and to a current limiter 108. The power from the power supply 107 is stored in an energy storage device 109, which is coupled to the power supply 107 via the current limiter 108. Both the control unit 106 and the power supplied are powered by the power source 105.

Figure 2A:
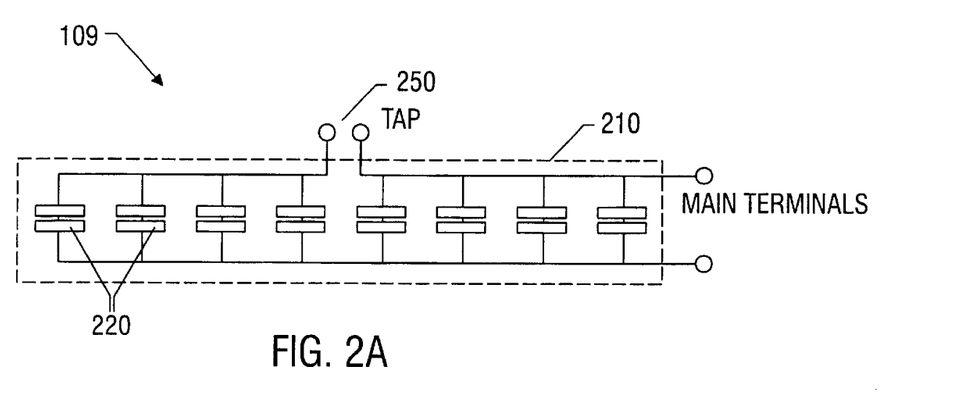
FIG. 2A illustrates an energy storage device of FIG. 1 as a high-voltage capacitor bank in accordance with one particular embodiment thereof.
Figure 2B:
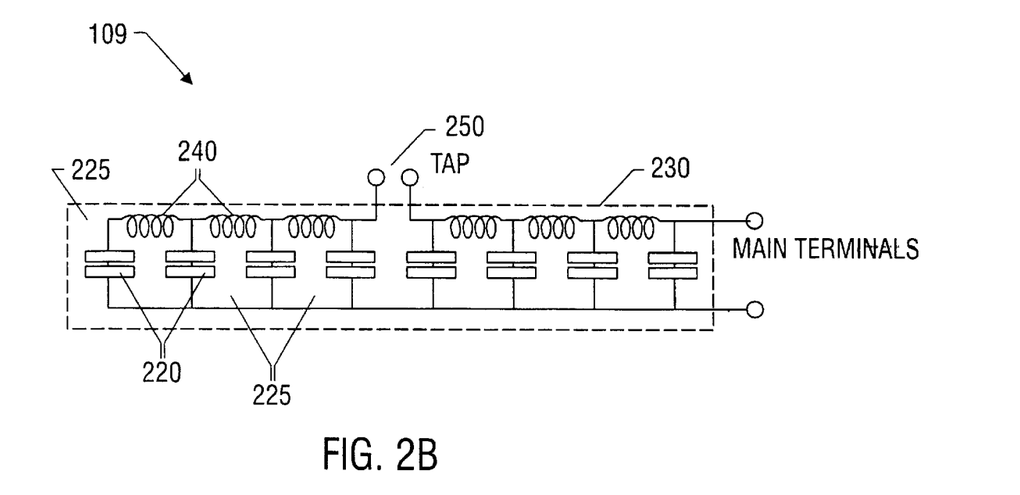
FIG. 2B shows the energy storage device of FIG. 1 as a delay line in accordance with another particular embodiment thereof.

FIGS. 2A and 2B illustrate alternative embodiments for the energy storage device 109. Turning now to FIG. 2A, the energy storage device 109, in accordance with one embodiment, is shown. The energy storage device 109 may be configured as a high-voltage capacitor bank 210 that includes a plurality of capacitors 220 coupled in parallel. In an alternative embodiment (referring to FIG. 2B), the energy storage device 109 may be configured as a delay line 230 that consists of multiple stages 225, with each stage 225 consisting of two capacitors 220 and an inductor 240. The energy storage device 109, when configured as the capacitor bank 210 of FIG. 2A, is generally more suitable when an analysis involving a deeper penetration of the earth's interior is desired. The delay line 230 of FIG. 2B, on the other hand, is usually more suitable for a shallow penetration of the earth's interior, which typically yields higher resolution measurements of the earth's interior.

The energy storage device 109, whether configured as the capacitor bank 210 of FIG. 2A or the delay line 230 of FIG. 2B, is further equipped with taps 250, which may be used to vary the pulse width of the transmitted pulse from the EM pulse generator 101. A user of the EM survey system 100 is able to enhance the analysis of the reflected signals from the earth's interior by adjusting the pulse width using the taps 250. That is, the earth is composed of a variety of sediments in which the signal attenuation and the reflection characteristics of a particular boundary layer of sediments will vary in relation with the transmitted frequency (i.e., pulse width). Thus, by adjusting the pulse width, a user of the EM survey system 100 will be able to improve the analysis of a particular region (which may predominately contain a particular sediment type) by "tailoring" the system 100 to that region.

Returning to the EM pulse generator 101 of FIG. 1, the energy storage device 109 is coupled to a sparkgap switch 110. When the voltage of the energy storage device 109 exceeds a predetermined threshold, an ionized gap (not shown) of the sparkgap switch 110 transfers the stored energy via an impedance matching network 111 to one of a plurality of transmit ground coupling transducers 113. In this manner, an EM pulse, as may be imparted to the earth's surface, is generated. The transmitted EM pulse from the matching network 111 is measured by a current monitor 112 for subsequent comparison with the reflected signals from the earth's interior when the EM pulse is generated.

The ground coupling transducers 113 may couple the EM pulse generator 101 to the earth's surface either invasively or non-invasively. In accordance with one embodiment, an invasive ground coupling is achieved by coupling the output terminals 114 of the EM pulse generator 101 to electrodes 115, which are buried shallow beneath the earth's surface. In an alternative embodiment, ground coupling of the EM pulse may be achieved via a wire loop 116 that is placed on the earth's surface to deliver the EM pulses to the earth's interior.

Subsequent to the EM pulse generator 101 transmitting EM pulses into the ground, the transmitted EM pulses are reflected by subterranean geological formations back to the earth's surface. The data acquisition system 102 receives reflected signals via a receiver module 120 of the data acquisition system 102. The reflected signals are received from the ground at the receiver module 120 via one of a plurality of receiver ground coupling transducers 121. The receive ground coupling transducers 121 may include a wire loop 122, one or more receiving electrodes 123, a wire antenna 124, or a high-gain rod antenna array 125.

The wire loop 122 can be coupled directly to the receiver module 120 via a set of input terminals 126, and is placed on the earth's surface to receive the reflected signals from the earth's interior. In one embodiment, the diameter of the wire loop 122 is three meters; however, it will be appreciated that the wire loop 122 could have a larger or smaller diameter without departing from the spirit and scope of the invention. The diameter of the wire loop 122 may depend on the size that would best suit a particular test region.

Figure 3A:
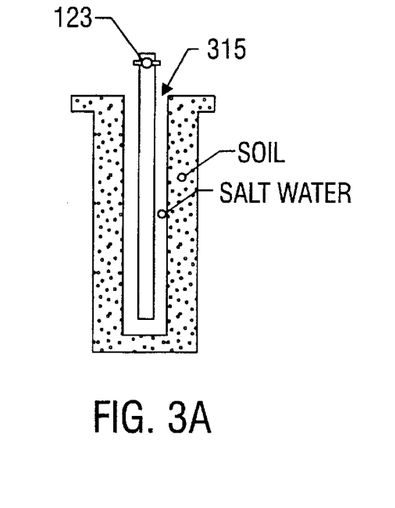
FIGS. 3A–D depict the configuration of a receive ground electrode.

Turning to FIG. 3A, one of the receiving electrodes 123 is shown in detail. The receiving electrode 123 is composed of a copper piping material that is inserted into a cavity 315 within the earth's surface. The cavity 315 is filled with salt water, which enhances the conductivity of the receiving electrode 123 with the earth's soil, thus providing a more accurate reception of the reflected signals from the earth's interior.

In one embodiment, a single receiving electrode 123 may be used to provide one-dimensional data for a one-dimensional analysis of a given point within a particular test region. Alternatively, the receiving electrodes 123 may be configured to receive reflected signals in the x, y, and z planes of a three-dimensional coordinate system, thus providing a greater detail of the earth's interior.

Figure 3B:
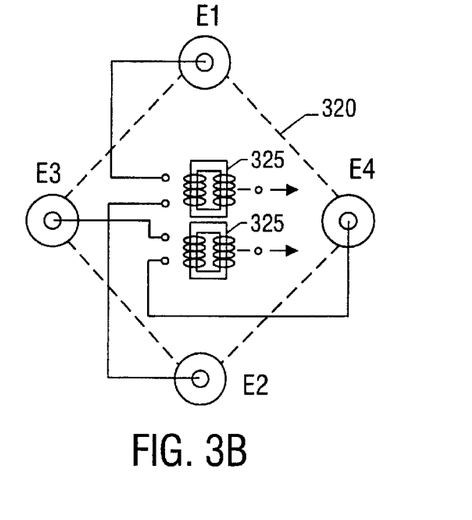
Figure 3C:
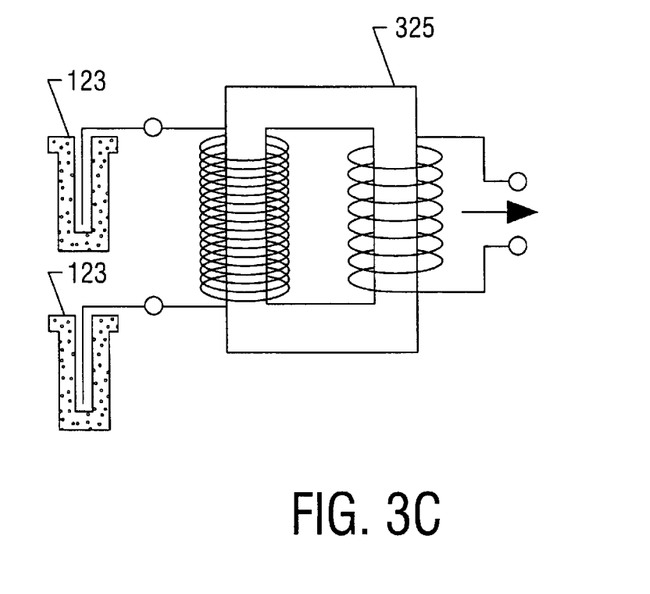

Referring to FIG. 3B, the reflected signals collected in the horizontal plane (i.e., the x and y directions) are received by two pairs of receiving electrodes 123 (E1, E2 for the x direction and E3, E4 for the y direction). These receiving electrodes E1–E4 are positioned on the corners of an imaginary square 320. Each pair of receiving electrodes (i.e., E1, E2 and E3, E4) are coupled to an impedance matching/isolation transformer 325. FIG. 3C shows the detail of the impedance matching/isolation transformer 325, along with its specific connections to the electrodes 123. The receiving electrodes E1 and E2 are coupled to the primary winding of one isolation transformer 325, while the receiving electrodes E3 and E4 are coupled to the primary winding of another isolation transformer 325. The secondary windings of the isolation transformers 325 are coupled to the receiver input terminals 126 of the receiver module 120.

Figure 3D:
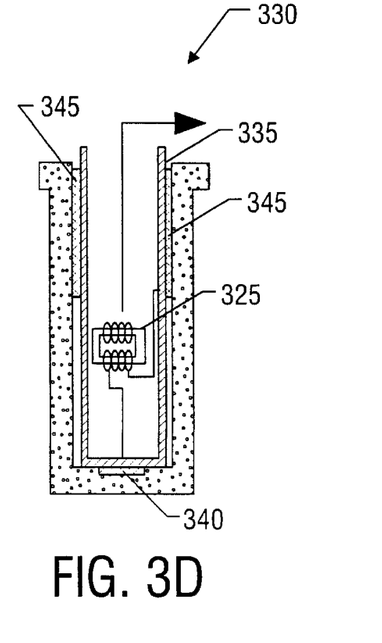

Referring to FIG. 3D, the z component of the reflected signals is measured by a dual contact electrode 330 disposed vertically beneath the earth's surface. This electrode 330 includes a non-conductive pipe 335, which includes a copper anode plate 340 on its bottom surface and a copper anode sleeve 345 that encircles the top of the pipe 335. Both the anode plate 340 and the sleeve 345 are connected via an impedance matching isolation transformer 325 to the input terminals 126 of the receiver module 120.

Figure 4:
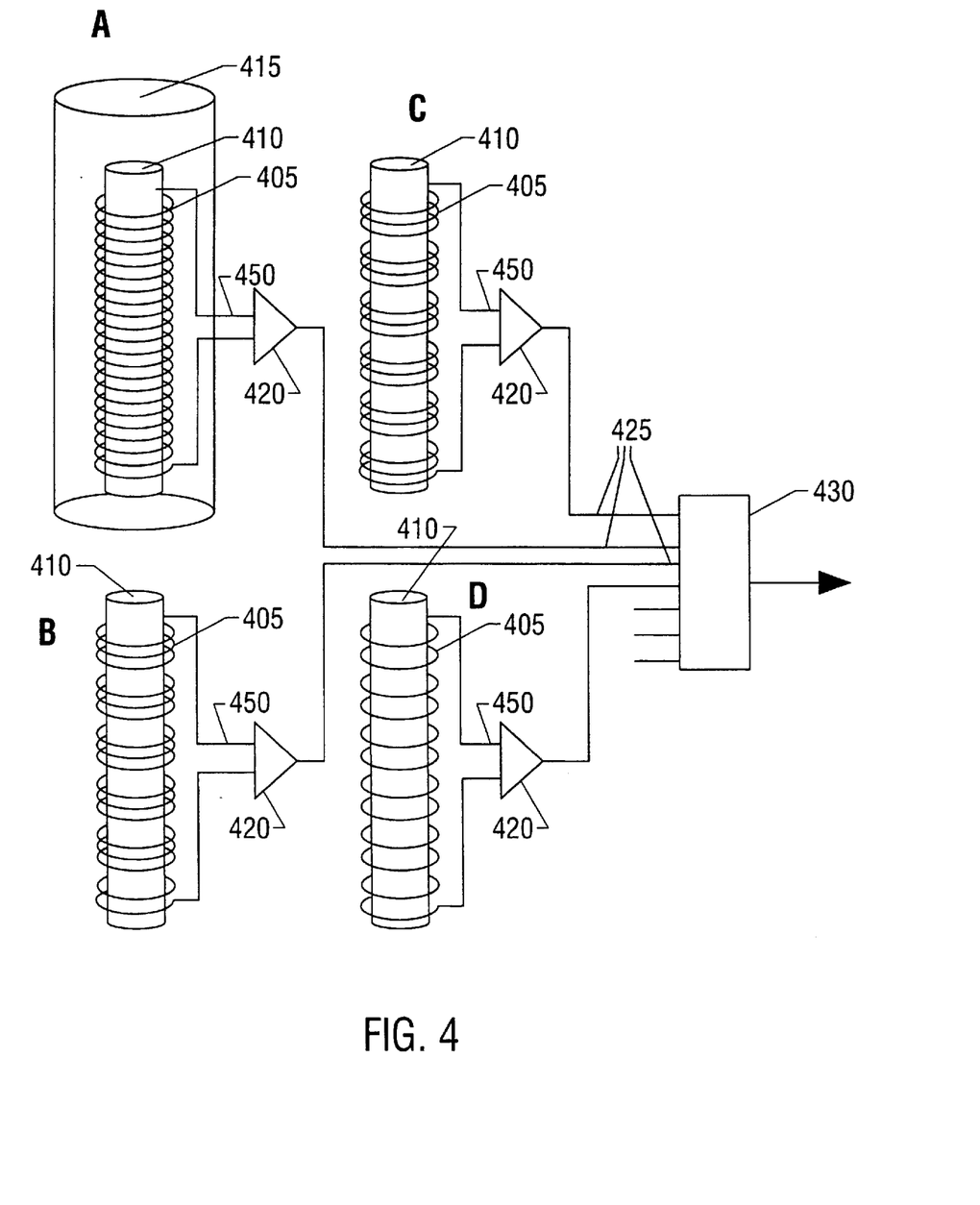
FIG. 4 shows the configuration of a rod antenna array.

Turning now to FIG. 4, the rod antenna array 125 of FIG. 1 is shown in detail. The rod antenna array 125 includes multiple sections A–D, with each section A–D consisting of ferrite rods 410 wound with wire 405 having a predetermined number of turns on each respective ferrite rod 410. Although only four sections A–D are shown in FIG. 4, it will be appreciated that any number of sections could be used without departing from the spirit and scope of the invention.

Each respective ferrite rod 410 of the sections A–D is disposed in a respective shield 415, shown only for the section A for the sake of clarity. Each of the sections A–D is broadly tuned, with each section A–D covering a particular part of the desired frequency spectrum to receive the reflected signals from the earth's interior. The output 450 of each section A–D is buffered by a low noise amplifier 420 and are each coupled to a respective input 425 of a radio frequency signal combiner 430.

The antenna array 125 is relatively small in size and covers the desired frequency band for receiving the reflected signals from the earth's interior. The antenna array 125 is also directional to reduce the likelihood of receiving interference from other nearby radio communications. The antenna array 125 is connected via the combiner 430 to the receiver module 120 via the input terminals 126 to supply the reflected signals thereto.

Returning to FIG. 1, the receiver module 120 of the data acquisition system 102, which receives the reflected waves from the receive ground coupling transducers 121, is powered by a battery 135 to enable the module 120 to be portable. The reflected signals received via any one of the receive ground coupling transducers 121 are passed via one of two channels, i.e., a logarithmic channel 137-140 or a linear channel 130-134, of the receiver module 120. The logarithmic and linear channels are capable of amplifying the reflected signals by 90 dB. The logarithmic channel 137-140 provides an output signal that contains a DC bias proportional to the strength of the signals and, therefore, is most useful in determining the magnitude of the reflected signals from a particular boundary layer of the earth's interior. The linear channel 130-134, on the other hand, provides greater detail of the sediment layers of the earth's interior from the reflected signals.

Each one of the channels may be activated at one time via a channel selector switch 136. When the switch 136 is set such that the reflected signals are received via the logarithmic channel 137-140, the signals are passed to a logarithmic amplifier 138 via a wide-band filter 140 and a high impedance, low noise, pre-amplifier 139. The output signal from the logarithmic amplifier 138 is buffered by a line driver 137, and, is subsequently passed to an A/D converter 141, which resides in a digital recording system 148 of the data acquisition system 102 for subsequent analysis.

When the channel selector switch 136 is set such that the reflected signals are received via the linear channel 130-134, the reflected signals are passed to a variable-gain, linear amplifier 132 via a wide-band filter 130 and a high impedance, low noise, pre-amplifier 131. The amplification factor of the linear amplifier 132 is controlled by a programmable Time Variable Gain (TVG) circuit 133. Both the RF signal and the TVG waveform are buffered by two line drivers 134 before being passed to the A/D converter 141 of the digital recording system 148. Communication between the receiver module 120 and the digital recording system 148 is via coaxial cable in one embodiment. However, it will be appreciated that communication between the receiver module 120 and the digital recording system 148 can be via other known communication mediums, whether wire or wireless, without departing from the spirit and scope of the invention.

Subsequent to receiving the reflected signals via either the logarithmic or linear channel, the dual channel A/D converter 141 of the digital recording system 148 converts the received and amplified analog signals to digital signals. The dual channel A/D converter 141 consists of a dual channel, high-speed (200 MHz) Digital Storage Oscilloscope (DSO) card and is controlled by a computer 142 (e.g., a laptop computer). Both the dual channel A/D converter 141 and the computer 142 are powered by a DC/DC power supply 143, which receives its power from a battery 144. In accordance with one embodiment, the battery 144 may be a 12-volt battery from a vehicle (not shown), in which the digital recording system 148 may reside. The digital recording system 148 further includes an optical transmitter 145 for sending commands to the EM pulse generator 101 over an optical coupling 150. In accordance with one embodiment, a user could initiate the commands via the computer 142. For example, such a command could instruct the control unit 106 to have the EM pulse generator 101 to generate an EM pulse.

The computer 142 of the digital recording system 148 further couples to a remote data processing system 103 via a communications link 151. The communications link 151 is a radio modem communication link in accordance with one embodiment. However, it will be appreciated that the communications link 151 could include other known types of communication mediums, whether wired or wireless, without departing from the spirit or scope of the present invention. The data received from the computer 142 from the A/D converter 141 is transferred over the link 151 to a CPU (central processing unit) 155 of the data processing system 103.

The data output from the current monitor 112, as previously discussed, is also received by the computer 142 via a communications link 152. This data regarding the transmitted EM pulse is also sent to the data processing system 103 along with that data regarding the reflected signals. The data is typically stored in storage 158, which is some form of random access memory associated with the CPU 155 and can be embodied as a hard drive, a removable hard drive, or a ZIP drive. The CPU 155 compares the data from the transmitted EM pulse to the data of the reflected signals in accordance with a programmed method. The method is performed by the CPU 155 pursuant to instructions encoded on a program storage medium (not shown). The program storage medium may be of any type know to the art, such as a hard disk, a floppy disk, or an optical disk.

The data processing system 103 further includes a variety of output devices. For instance, a display unit 159 is coupled to the CPU 155 for providing the results of the data to a user in a visually perceptible manner. The data processing system 103 is further equipped with a color plotter 156 and a printer 157 for also providing a visual representation of the data in "hard copy" format.

Figure 5:
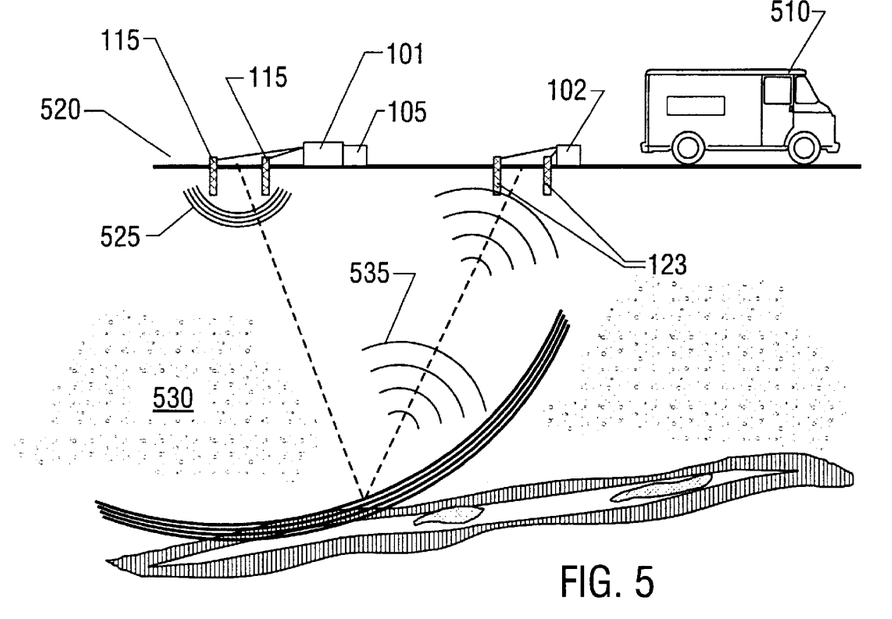
FIG. 5 depicts the system of FIG. 1 in a static mode of operation.

The apparatus 100 may be used to survey the earth's interior in either a static mode or a profiling mode of operation. Referring to FIG. 5, such static mode of operation is shown. In this particular mode, mostly ground electrodes 115 are deployed for delivering the EM pulse 525 to the ground 520 as opposed to the wire loop 116. By using the ground electrodes 115, the signal-to-noise ("S/N") ratio is improved and a greater depth penetration is usually obtained of the earth's interior 530. The reflected signals 535 from the EM pulse 525 are received via the receive ground electrodes 123, and passed to the receiver module 120 on board the vehicle 510 and the digital recording system 148 for processing. Surveying in the static mode can be performed either at a single point (i.e., in one-dimension), as shown in FIG. 5, or can be conducted in a line, where probing occurs at predetermined distances thereby providing a two-dimensional representation. Three-dimensional imaging is achieved when probing occurs along parallel lines.

Figure 6:
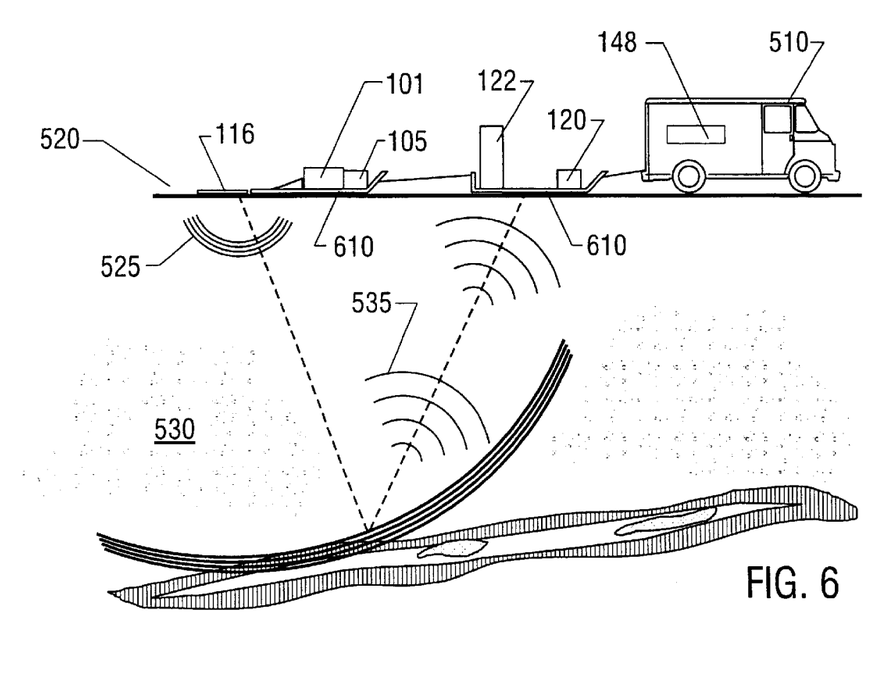
FIG. 6 shows the system of FIG. 1 in a profiling mode of operation.

Referring to FIG. 6, the profiling mode of operation is shown. In this particular mode, rapid two and three-dimensional imaging is achieved by mounting the EM pulse generator 101 and the receiver system 120 on separate sleds 610. The sleds 610 are towed behind a vehicle 510, which has the digital recording system 148 resident thereon. During the profiling mode, the vehicle 510 is stopped at predetermined, fixed intervals to probe the earth's interior. As a result of the motion of the EM survey system 100 in this particular mode, ground contact is made via a non-invasive coupling. Such non-invasive coupling is achieved via the wire loops 116, 122, the wire antenna 124, and the rod antenna array 125.

Figure 7:
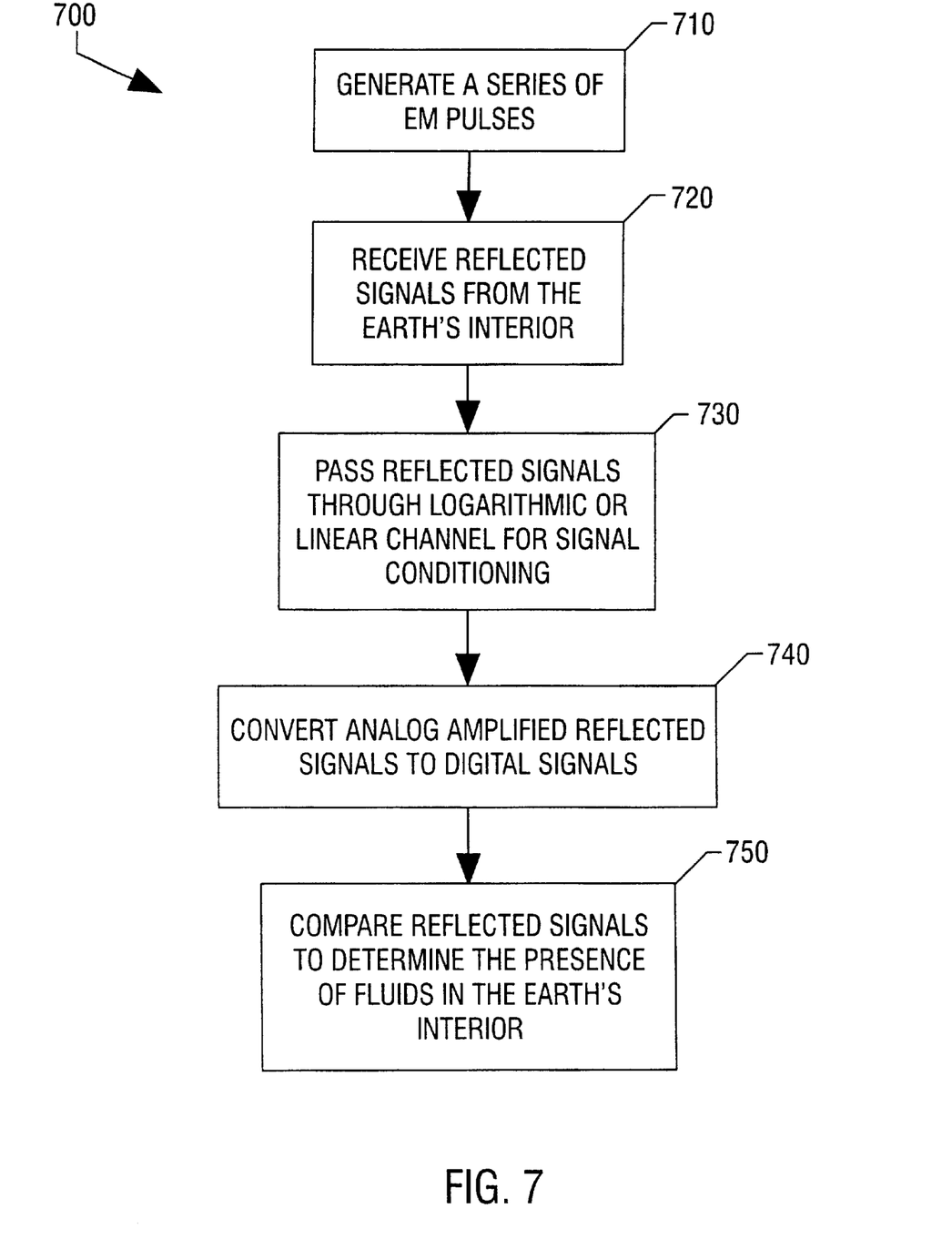
FIG. 7 illustrates a method for determining the presence of fluids within the earth's interior as may be performed by the system of FIG. 1.

Turning now to FIG. 7, a method 700 for determining the presence of fluids within the earth's interior in accordance with the present invention is shown. The method 700 may be practiced using the system 100 of FIG. 1, although this is not necessary to the practice of the invention. The method 700 may be used to obtain data in a static mode, as discussed above in connection with FIG. 5, or in a profiling mode, as discussed above in connection with FIG. 6. These and other variations, as may be apparent to those skilled in the art having the benefit of this disclosure, are all considered within the scope and spirit of the invention claimed below.

The method 700 for generating EM pulses into the earth's interior and analyzing the reflected signals therefrom in accordance with the present invention commences at step 710, wherein a series of EM pulses is generated into the earth's interior. At step 720, reflected signals are received from the earth's interior and, at step 730, are passed through a filtering and amplification channel. The filtered and amplified signals are, at step 740, converted to digital signals. The digital signals are then, at step 750, are compared to determine the presence of fluids within the earth's interior.

Figure 8:
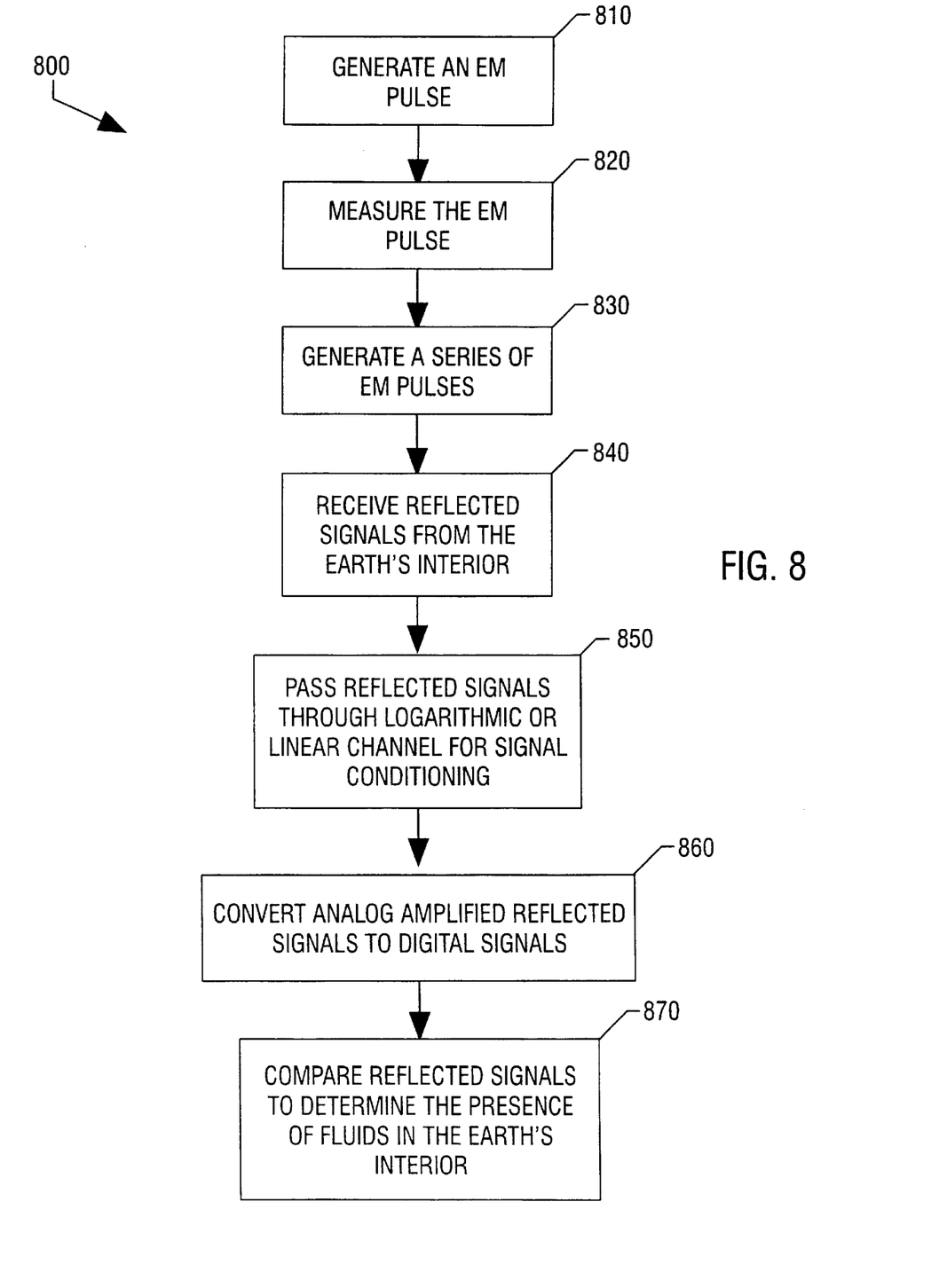
FIG. 8 illustrates one particular embodiment of the process of FIG. 7.

Turning now to FIG. 8, one particular embodiment 800 of the method 700 for generating EM pulses into the earth's interior and analyzing the reflected signals therefrom in accordance with the present invention is shown. This particular embodiment is implemented using the system 100 of FIGS. 1–4 discussed above. As noted previously, however, this is not necessary to the practice of the invention.

The process 800 commences at step 810, where an initialization phase occurs and a user of the EM survey system 100 initiates the generation of a single EM pulse. In accordance with one embodiment, the user can cause a pulse to be transmitted from the EM pulse generator 101 via a command entered into the computer 142. The command is transmitted via the transmitter 145 over the optical link 150 to the control unit 106 of the EM pulse generator 101. When activated by the user, the control unit 106 energizes the power supply 107, which in turn charges the energy storage device 109 via the current limiter 108. The energy storage device 109 is charged until a threshold voltage of the sparkgap switch 110 is reached, in which case an ionized gap (not shown) of the sparkgap switch 110 transfers the stored energy via the matching network 111 to one of the ground coupling devices 113. During the initialization phase, the power supply 107 is deactivated after the generation of the first EM pulse. The user has the capability to adjust the output power level via an aperture adjustment (not shown) on the sparkgap switch 110. The pulse width can be adjusted via the taps 250 on the energy storage device 109. The pulse repeat period (i.e., the elapsed time between successive pulse generation) can be adjusted by controlling the output current supplied by the power supply 107.

During the initialization phase, the EM pulse generated in step 810 is measured via the current monitor 112 at step 820. This measurement of the EM pulse is then sent from the current monitor 112 to the digital recording system 148 over a link 152 for conversion to a digital signal by the A/D converter 141 for subsequent comparison with the reflected signals.

Subsequent to the initialization phase, the process 800 continues to step 830, where the user generates a series of EM pulses (e.g., 30 pulses) into the ground for subsequent analysis of the reflected signals. During this period of multiple pulse generation, the power supply 107 stays engaged until all of the pulses have been generated. Once the EM pulses have been transferred to the ground via the ground coupling devices 113, the reflected signal from the earth's interior is received at step 840 via one of the ground coupling devices 121, where the reflected signals are transferred to the receiver module 120. This process is repeated "n" times in a rapid fashion. At step 850, the reflected signals are passed either through the logarithmic channel 137-140 or the linear channel 130-134 depending on the state of the switch 136 set by the user. Generally, the logarithmic channel 137-140 is most useful in determining the magnitude of the reflected signals from a particular boundary layer of the earth's interior. The linear channel 130-134, on the other hand, provides greater detail of the sediment layers of the earth's interior from the reflected signals.

At step 860, the analog, amplified reflected signals are converted to digital signals by the A/D converter 141 of the digital recording system 148. Next, at step 870, the reflected signals are compared against one another. The reflected signals from each test taken at a particular location are stacked and compared against one another in the time domain.

In comparing the signals, sections of correlated returns indicate the presence of solid boundaries, while the observance of uncorrelated phase data indicates the presence of a fluid bearing subterranean formation in the earth's interior. The phase and amplitude changes of signals in the uncorrelated category are caused by electro-molecular conversions, where the fluids within the earth's interior are bombarded with the EM wavelets. The electro-molecular conversion causes the reflected signals from within these porous layers of the earth's interior to be randomly modulated, which shows up as uncorrelated amplitude and phase changes in the reflected signals. Thus, these uncorrelated signals indicate the likelihood of a liquid or gaseous substance beneath the earth's surface. Typically, a gaseous substance will yield reflected signals having a higher frequency content; whereas a liquid substance will yield reflected signals with a lower frequency content.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   an electromagnetic pulse generator for generating a plurality of electromagnetic pulses, said electromagnetic pulse generator includes:
      an energy storage device for storing a voltage supplied from an external source;
      a sparkgap switch, coupled to said energy storage device, for generating said electromagnetic pulses when a predetermined threshold voltage of said energy storage device is achieved; and
      a matching network, coupled to said sparkgap switch, for passing said electromagnetic pulses to said transmit ground coupling device;
   a transmit ground coupling transducer, coupled to said pulse generator, for delivering said electromagnetic pulses to the earth's interior;
   a data acquisition system for processing a plurality of reflected signals, said reflected signals being said electromagnetic pulses reflected from the earth's interior;
   a receive ground coupling transducer, coupled to said data acquisition system, for receiving and supplying said reflected signals to said data acquisition system; and
   a data processing system, coupled to said data acquisition system, for comparing said reflected signals to determine the existence of fluids in the earth's interior.

2. The apparatus of claim 1, wherein said electromagnetic pulse generator further comprises:
   a current monitor for monitoring the pulse waveform of said electromagnetic pulses for subsequent comparison with said reflected signals.

3. The apparatus of claim 1, wherein said electromagnetic pulses generator further comprises:
   a control unit for controlling said electromagnetic pulse generator;
   a power supply, coupled to said control unit and said external source, for supplying power to said electromagnetic pulse generator; and
   a current limiter, coupled to said power supply and said energy storage device, for limiting the current output from said power supply.

4. The apparatus of claim 1, wherein said transmit ground coupling transducer comprises one selected from a group of:
   at least one electrode; and
   a wire loop.

5. The apparatus of claim 1, wherein said energy storage device comprises one selected from a group of:
   a capacitor bank; and
   a delay line.

6. The apparatus of claim 5, wherein said capacitor bank comprises:
   a plurality of capacitors coupled in parallel.

7. The apparatus of claim 5, wherein said delay line comprises:
   a plurality of stages, wherein each respective stage includes two capacitors and an inductor.

8. The apparatus of claim 1, wherein said receive ground coupling; transducer comprises one selected from a group of:
   at least one electrode;
   a wire loop;
   a wire antenna; and
   a rod antenna array.

9. The apparatus of claim 1, wherein said data acquisition system further comprises:
   a receiver module, including:
      a logarithmic channel for amplifying said one or more reflected signals;
      a linear channel for amplifying said one or more reflected signals; and
      a switch for activating either said logarithmic channel or said linear channel to receive said one or more reflected signals.

10. The apparatus of claim 9, wherein said logarithmic channel further comprises:
    a filter, a pre-amplifier, a logarithmic amplifier, and a line driver for conditioning said one or more reflected signals.

11. The apparatus of claim 9, wherein said linear channel further comprises:
    a filter, a pre-amplifier, a linear amplifier, a time variable gain circuit, and a dual-line driver for conditioning said one or more reflected signals.

12. The apparatus of claim 9, wherein the data acquisition system further comprises:
    a digital recording system, including:
       an analog-to-digital converter for converting said reflected signals to digital signals received from said receiver module; and
       a computer module for receiving and processing said digital signals.

13. A method for determining the presence of fluids within the earth's interior, comprising:
    generating a series of electromagnetic pulses into the earth's interior, said generating comprises: storing a voltage in an energy storage device; and generating said series of electromagnetic pulses when said voltage in said energy storage device reaches a predetermined threshold;
    receiving a series of reflected signals from the earth's interior, said reflected signals being said electromagnetic pulses reflected from the earth's interior;
    passing said series of reflected signals through a filtering and amplification channel;
    converting said amplified reflected signals to digital signals; and
    comparing said reflected signals to determine the presence of a fluid within the earth's interior.

14. The method of claim 13, wherein said generating further comprises:
    transmitting said series of electromagnetic pulses to the earth's interior via a wire loop or a set of ground electrodes.

15. The method of claim 13, wherein said receiving further comprises:

receiving said series of reflected signals from the earth's interior via a wire loop, a set of ground electrodes, a wire antenna, or a rod antenna array.

16. The method of claim 13, wherein said comparing further comprises:

determining for the presence of uncorrelated amplitude and phase charges in said received series of reflected signals.

17. An apparatus, comprising:

means for generating a plurality of electromagnetic pulses, said generating means comprises:
an energy storage device for storing a voltage supplied from an external source;
a sparkgap switch, coupled to said energy storage device, for generating said electromagnetic pulses when a predetermined threshold voltage of said energy storage device is achieved; and
a matching network, coupled to said sparkgap switch, for passing said electromagnetic pulses to said transmit ground coupling device;

means for delivering electromagnetic pulses generated by said pulse generating means to the earth's interior;

means for processing a plurality of reflected signals, said reflected signals being electromagnetic pulses delivered by said delivering means and reflected from the earth's interior;

means for receiving and supplying reflected signals to said processing means; and means for comparing received reflected signals to determine the presence of fluids in the earth's interior.

18. The apparatus of claim 17, wherein said means for generating a plurality of electromagnetic pulses further comprises:

a current monitor for monitoring the pulse waveform of said electromagnetic pulses for subsequent comparison with said reflected signals.

19. The apparatus of claim 17, wherein said means for generating a plurality of electromagnetic pulses further comprises:

a control unit for controlling said means for generating a plurality of electromagnetic pulses;
a power supply, coupled to said control unit and said external source, for supplying power to said means for generating a plurality of electromagnetic pulses; and
a current limiter, coupled to said power supply and said energy storage device, for limiting the current output from said power supply.

20. The apparatus of claim 17, wherein said means for delivering comprises one selected from a group of:

at least one electrode; and
a wire loop.

21. The apparatus of claim 17, wherein said energy storage device comprises one selected from a group of:

a capacitor bank; and
a delay line.

22. The apparatus of claim 21, wherein said capacitor bank comprises:

a plurality of capacitors coupled in parallel.

23. The apparatus of claim 21, wherein said delay line comprises:

a plurality of stages, wherein each respective stage includes two capacitors and an inductor.

24. The apparatus of claim 17, wherein said means for receiving comprises one selected from a group of:

at least one electrode;
a wire loop;
a wire antenna; and
a rod antenna array.

25. The apparatus of claim 17, wherein said processing means further comprises:

a receiver module, including:
a logarithmic channel for amplifying said one or more reflected signals;
a linear channel for amplifying said one or more reflected signals; and
a switch for activating either said logarithmic channel or said linear channel to receive said one or more reflected signals.

26. The apparatus of claim 25, wherein said logarithmic channel further comprises:

a filter, a pre-amplifier, a logarithmic amplifier, and a line driver for conditioning said one or more reflected signals.

27. The apparatus of claim 25, wherein said linear channel further comprises:

a filter, a pre-amplifier, a linear amplifier, a time variable gain circuit, and a dual-line driver for conditioning said one or more reflected signals.

28. The apparatus of claim 25, wherein the processing means further comprises:

a digital recording system, including:
an analog-to-digital converter for converting said reflected signals to digital signals received from said receiver module; and
a computer module for receiving and processing said digital signals.

* * * * *

UNITED STATES PATENT AND TRADEMARK OFFICE
CERTIFICATE OF CORRECTION

PATENT NO. : 6,188,221 B1
DATED : February 13, 2001
INVENTOR(S) : Van de Kop et al.

It is certified that error appears in the above-identified patent and that said Letters Patent is hereby corrected as shown below:

Column 10,
Line 7, replace "coupling;" with -- coupling --

Column 11,
Line 7, replace "charges" with -- changes --

Column 5,
Line 12, replace "matching isolation" with -- matching/isolation --

Signed and Sealed this

Sixteenth Day of October, 2001

*Attest:*

NICHOLAS P. GODICI
*Attesting Officer*  Acting Director of the United States Patent and Trademark Office